June 17, 1941.   F. G. GISE   2,246,170
BUCKLE
Filed Nov. 12, 1940   2 Sheets-Sheet 1

INVENTOR
Frank G. Gise

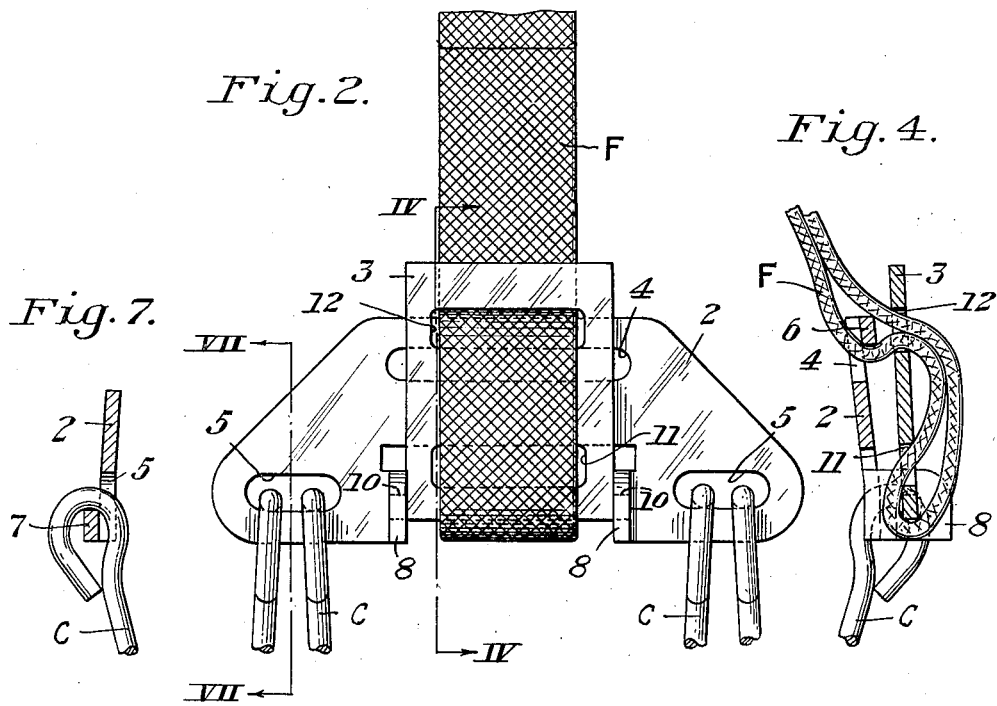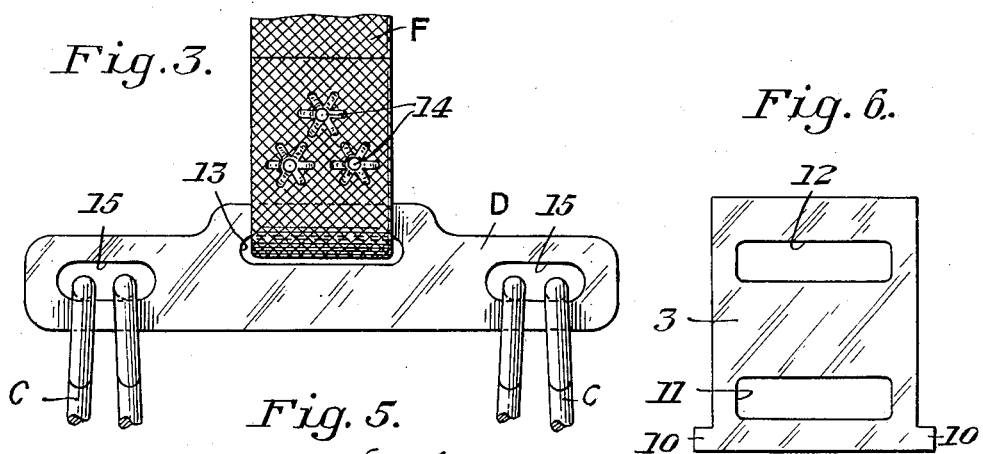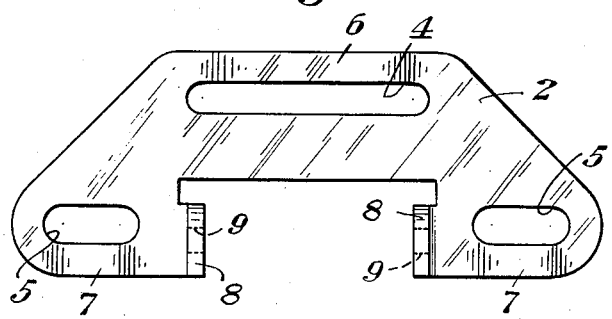

Patented June 17, 1941

2,246,170

UNITED STATES PATENT OFFICE 2,246,170

BUCKLE

Frank G. Gise, York, Pa., assignor to The McKay Company, Pittsburgh, Pa., a corporation of Pennsylvania Application November 12, 1940, Serial No. 365,145

7 Claims. (Cl. 24—193)

The present invention relates to buckles and more particularly to buckles which are designed for use with emergency tire chain units. While the present invention is particularly applicable to emergency tire chain units, it is also applicable to other uses where a buckle of this general type may be employed. Since the buckle constituting my invention is primarily intended for use in connection with emergency tire chain units it has been shown in the accompanying drawings and hereinafter will be described in conjunction with an emergency tire chain, but it will be understood that this is not by way of limitation and that the buckle which I provide can be used for various other purposes.

An emergency tire chain unit usually comprises an anchor plate, a buckle, a strap, and two cross chains. One end of each chain is attached to the anchor plate and the other end of each chain is usually attached to the body portion or main plate member of the buckle. One end of the strap is usually secured to the anchor plate and the other end is held by the buckle when the chain is in position. In attaching the unit tire chain to a vehicle wheel the chains extend across the tread of the tire and the strap is passed under the felly of the wheel and the strap passed through the buckle. The emergency tire chain unit is applied to the tire so that the buckle is on the outer face of the wheel. If the buckle releases the strap during the operation of the vehicle the chain unit will fall clear of the wheel and ordinarily will be lost.

According to the present invention, I provide a buckle which is especially convenient for use on emergency tire chains and in other applications where a strap has to be pulled quite tight and thereafter held securely against slipping. The buckle which I provide is of such character that the emergency tire chain unit may be applied to a vehicle wheel with relatively little difficulty and it permits the strap and therefore the chains to be pulled very tight. The buckle is so constructed that after the strap has been pulled tight and the buckle has been closed the strap will not slip and become accidentally released. The buckle which I provide is of a highly practical nature and comprises few parts and consequently can be manufactured economically.

In the accompanying drawings I have shown for purposes of illustration only a preferred embodiment of my invention when included in an emergency chain. In the drawings, Figure 1 is a cross section through a tire and wheel showing an emergency chain with a buckle embodying my invention applied thereto;

Figure 2 is a front elevation of the buckle in closed position with the strap passing therethrough;

Figure 3 is a front elevation of the anchor plate to which one end of the strap and one end of each chain are secured;

Figure 4 is a section taken along the line IV—IV of Figure 2;

Figure 5 is an elevational view of the plate member of the buckle;

Figure 6 is an elevational view of the tongue member of the buckle; and

Figure 7 is a section taken along the line VII—VII of Figure 2.

Figure 1:
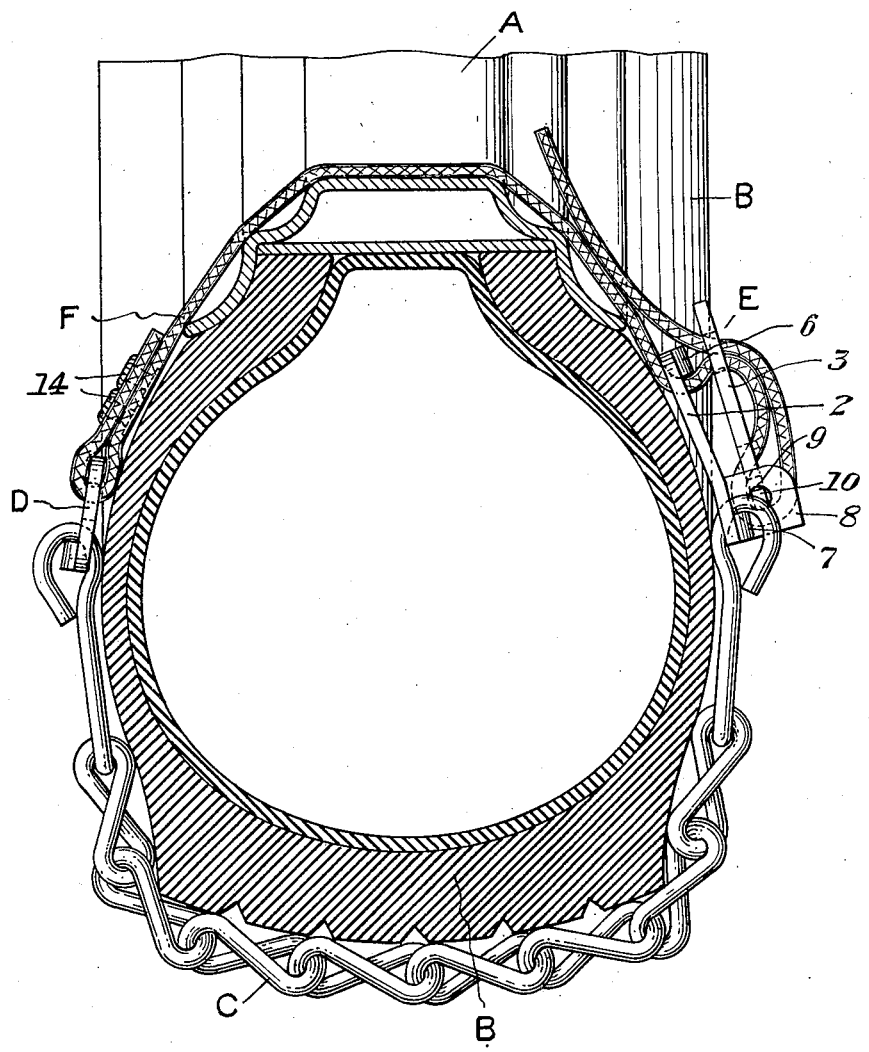

Referring to Figure 1, A designates the rim or felly of a vehicle wheel and B designates a pneumatic tire mounted thereon. The emergency tire chain unit comprises the cross chains C which are anchored at one end to the anchor plate D and which have their other ends attached to the buckle unit indicated generally by E. A flexible strap F has one end secured to the anchor plate D and the other end thereof is held in position by the buckle unit E. The buckle unit E comprises a plate 2 and a tongue 3. The plate member or buckle plate is provided with a strap-receiving slot 4 adjacent its upper end and slots 5 adjacent its lower end. These latter slots are adapted to receive one end of each chain. The portion 6 of the plate member positioned above the strap-receiving slot 4 is bent forwardly of the buckle so as to provide additional space for the strap F to pass between the plate member and the tire without forcing the buckle away from the surface of the tire to an unnecessary extent. The portions of the plate member 7 below the slots 5 are likewise bent forwardly so that the ends of the chains will not force the buckle too far away from the surface of the tire. The plate member is also provided with upstanding ears 8 which extend substantially vertically to the general plane of the plate member. These ears are spaced apart and the plate member is cut away between these ears and for a short distance above the ears. These ears provide a pivoted mounting for the tongue member 3. The plate adjacent these upstanding ears is cut away to provide adequate space for threading the strap through the parts of the buckle. As is shown in Figures 1 and 4, the strap ordinarily does not extend rearwardly into this cut-away portion of the plate member as the pivot points of the buckle are spaced a sufficient distance forwardly of the general plane of the plate to provide sufficient space for the strap. The ears 8 have openings 9 therethrough for receiving the pivots of the tongue member.

The tongue member is provided with laterally extending pivots 10 which are adapted for mounting in the holes 9 in the upstanding ears on the buckle plate. A strap-receiving slot 11 extends through the tongue adjacent the end carrying the pivots 10. A second strap-receiving slot 12 extends through the tongue member adjacent the upper end thereof. This second strap-receiving slot is so located in the tongue member that when the tongue is rotated about its pivots so that it is substantially parallel to the plate member it is adjacent the strap-receiving slot 4 in the plate member. While this slot is adjacent the slot in the plate member it is offset therefrom to a slight extent, as shown in Figure 4, so that when the strap F is passed through the slot in the plate and then through the slot 12 in the tongue it will be bent. These slots are preferably so arranged that when the strap is in position it will bear against the upper face of the slot 4 and against the lower face of the slot 12.

The anchor plate D, as shown in the drawings, is one of usual construction. It is provided with a strap-receiving slot 13 through which the one end of the strap F passes. The strap is bent upon itself and riveted together by rivets 14. The anchor plate also has chain-receiving slots 15 therein adapted to receive the one end of each of the chains.

The general assembly of the buckle and the manner of using it may be seen readily by reference to Figures 1, 2 and 4. When the emergency tire chain unit is applied to the tire, the end of the strap F is passed outwardly through the strap-receiving slot 4 in the plate member of the buckle. The end of the strap is then passed outwardly through the strap-receiving slot 12 in the tongue member. It is then passed inwardly through the strap-receiving slot 11 of the tongue and then outwardly around the bottom of the tongue. The free end of the strap is then passed upwardly and inwardly through the strap-receiving slot 12 of the tongue. By passing the free end of the strap inwardly through the slot 12 in the tongue it extends inwardly toward the rim of the wheel and will not be in position where it will strike anything exteriorly adjacent the wheel. It is not essential that the end of the strap be passed inwardly through the upper slot 12 in the tongue in order to have the unit chain remain in position on the tire, as the strap will be adequately clamped and held in position without this expedient. Even though the strap is not pulled hard enough to prevent any play from remaining in the unit, the strap will not become loosened. Even though the tongue member moves inwardly or outwardly to some extent, there will be no substantial tendency for the strap to slide therethrough due to the character of the clamping action obtained by this buckle.

In mounting the unit chain on the wheel it is preferable to rotate the tongue about its pivots so that it extends at a substantial angle to the plate. This facilitates the passing of the strap through the strap-receiving slot in the buckle plate and through the upper strap-receiving slot in the tongue. With the tongue in this position the unit can be tightened on the wheel and after it has been appropriately tightened the tongue can be moved rearwardly to a position approximately parallel to the plate member. This movement securely clamps the strap and the operator can then readily pass the strap inwardly through the bottom strap-receiving slot in the tongue and pull it tight. Thereafter, if desired, the free end of the strap can be passed inwardly through the upper strap-receiving slot in the tongue so that it will extend inwardly of the wheel.

To release the buckle and remove the chain from the wheel it is merely necessary for the operator to pull the free end of the strap outwardly through the upper slot in the tongue and to then force the strap outwardly through the bottom slot in the tongue. The tongue then can be moved outwardly to a position where the strap can be passed inwardly through the upper slot in the tongue and the slot in the buckle plate.

As will be apparent from what has been stated above, this invention provides a buckle embodying only two parts which may be produced by relatively simple manufacturing operations. The buckle is convenient to use in that the operator merely has to pass the free end of the strap outwardly through two slots and to then rotate the tongue member on its pivots to a position where it is approximately parallel with the buckle plate. When this is done the strap is held in position and the remaining operations can be performed without any difficulty. When the tongue member is rotated inwardly after the strap is passed therethrough, due to the offsetting of the slots a positive clamping action is obtained on the strap. The strap is forced into tight engagement with the upper face of the slot in the buckle plate and into tight engagement with the bottom face of the upper slot in the tongue member. The strap is kinked and consequently held tightly in position.

While I have shown and described a preferred embodiment of my invention, it will be understood that various changes and modifications may be made therein and that my invention may be otherwise embodied within the scope of the appended claims. It will also be apparent that while my invention is particularly applicable to emergency tire chain units it can be applied to various other types of installations.

I claim:

1. A buckle of the class described comprising a plate member having a strap-receiving slot therein adjacent one end thereof and a tongue member pivotally supported on the plate member adjacent the other end thereof and having a strap-receiving slot adjacent the pivoted end thereof and a second strap-receiving slot therein adjacent the other end.

2. A buckle of the class described comprising a plate member having a strap-receiving slot therein intermediate the ends thereof, and a tongue member pivotally supported on the plate member, said tongue member having a strap-receiving slot therein intermediate its ends and a second strap-receiving slot adjacent but nevertheless offset from the strap-receiving slot in the plate member when the tongue member is in a position approximately parallel to the plate member.

3. A buckle of the class described comprising a plate member having a strap-receiving slot therein intermediate the ends thereof, and a tongue member pivotally supported on the plate member and having a strap-receiving slot therein adjacent the pivoted end thereof and a second strap-receiving slot adjacent the strap-receiving slot in said plate member when moved to a position substantially parallel to said plate member, whereby a strap may be passed through the slot in the plate member, then through the last mentioned slot in the tongue and then through the other strap-receiving slot of the tongue.

4. A buckle of the class described comprising a plate member having a strap-receiving slot therein intermediate the ends thereof, and a tongue member pivotally supported on the plate member and having a strap-receiving slot therein adjacent the pivoted end thereof and a second strap-receiving slot therein adjacent the strap-receiving slot in said plate member when moved to a position substantially parallel to said plate member, the distance between the pivot point and the second strap-receiving slot in the tongue being greater than the distance between said pivot point and the strap-receiving slot in the plate member.

5. A buckle of the class described comprising a plate member having a strap-receiving slot and spaced ears extending out of the general plane of the plate member, and a tongue member pivotally mounted on said spaced ears for movement from a position substantially parallel to the general plane of the plate member to a position at a substantial angle relative thereto, said tongue member having at least two strap-receiving slots therein, one of said slots being so located in the tongue member that it is adjacent but slightly offset relative to the slot in the plate member when the tongue is in a position substantially parallel with the plate member.

6. A buckle of the class described comprising a plate member having a strap-receiving slot and spaced ears extending substantially perpendicular to the general plane of the plate member, and a tongue pivotally mounted on said spaced ears for movement from a position substantially parallel to the general plane of the plate member to a position at a substantial angle thereto, said tongue member having a strap-receiving slot adjacent the pivoted end thereof and a second strap-receiving slot intermediate the ends thereof, said second slot being so located that it is adjacent but offset vertically relative to the slot in the plate member when the tongue is in a position subsantially parallel with the plate member.

7. A buckle of the class described comprising a plate member having a strap-receiving slot therein and spaced ears extending out of the general plane of the plate member, said plate member being cut away between said spaced ears, and a tongue member pivotally mounted on said spaced ears for movement from a position substantially parallel to the general plane of the plate member to a position at a substantial angle thereto, said tongue member having at least two strap-receiving slots therein, one of said slots being so located that it is adjacent but offset vertically relative to the slot in the plate member when the tongue is in a position substantially parallel with the plate member.

FRANK G. GISE.